US012474997B2

(12) United States Patent
Li

(10) Patent No.: US 12,474,997 B2
(45) Date of Patent: Nov. 18, 2025

(54) FILTER FOR CAMERA UPLOAD

(71) Applicant: Dropbox, Inc., San Francisco, CA (US)

(72) Inventor: Qimeng Li, Bellevue, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/382,811

(22) Filed: Oct. 23, 2023

(65) Prior Publication Data
US 2025/0130900 A1  Apr. 24, 2025

(51) Int. Cl.
*G06F 16/54* (2019.01)
*G06F 11/14* (2006.01)
*G06F 16/583* (2019.01)
*G06V 10/75* (2022.01)
*G06V 10/77* (2022.01)
*G06V 10/94* (2022.01)
*G06V 20/30* (2022.01)
*G06V 20/70* (2022.01)

(52) U.S. Cl.
CPC .......... *G06F 11/1451* (2013.01); *G06F 16/54* (2019.01); *G06F 16/583* (2019.01); *G06V 10/751* (2022.01); *G06V 10/77* (2022.01); *G06V 10/945* (2022.01); *G06V 20/30* (2022.01); *G06V 20/70* (2022.01); *G06F 2201/80* (2013.01)

(58) Field of Classification Search
CPC .... G06F 16/50; G06F 16/583; G06F 16/2423; G06F 16/2428; G06F 16/2457; G06F 16/24573; G06F 16/535
See application file for complete search history.

(56) References Cited

U.S. PATENT DOCUMENTS

| 7,639,943 | B1 | 12/2009 | Kalajan |
| 8,473,991 | B2 | 6/2013 | Hao et al. |
| 8,996,462 | B2 * | 3/2015 | Macaskill ............... G06F 16/58 707/634 |
| 9,952,935 | B2 * | 4/2018 | DeLuca .................. H04L 67/06 |
| 10,599,956 | B2 | 3/2020 | Huang |
| 10,725,870 | B1 | 7/2020 | Gu et al. |
| 10,747,621 | B2 | 8/2020 | Natanzon et al. |
| 10,867,209 | B2 | 12/2020 | Coven et al. |
| 10,885,095 | B2 * | 1/2021 | Li ............................ G06F 16/48 |
| 11,089,101 | B2 | 8/2021 | Kistler et al. |
| 2014/0081926 | A1 * | 3/2014 | Adams .................... G06F 16/50 707/692 |
| 2014/0122471 | A1 * | 5/2014 | Houston ............... G06F 16/958 707/731 |
| 2014/0181157 | A1 * | 6/2014 | Houston ................. G06F 16/22 707/812 |

(Continued)

*Primary Examiner* — James E Richardson
(74) *Attorney, Agent, or Firm* — Polsinelli PC

(57) ABSTRACT

A system and method are provided for automatically selecting a subset of photos to be backed up by an intelligent photo upload service provided by a content management system. The intelligent photo upload service is provided to a client application on a client device that uses one or more machine-learning models to determine which photos have the one or more attributes. The photos that have been determined to have the one or more attributes may be uploaded. Once uploaded the one or more attributes may be used to label the respective photos with metadata indicating the presence of the one or more attributes. The one or more attributes may be used to filter photos at the content management system.

20 Claims, 11 Drawing Sheets

(56) References Cited

U.S. PATENT DOCUMENTS

| | | |
|---|---|---|
| 2015/0286897 A1 | 10/2015 | Spaith |
| 2017/0094023 A1 | 3/2017 | Jack et al. |
| 2018/0144045 A1* | 5/2018 | Cuccinelli, Jr. ......... G06F 16/48 |
| 2019/0108097 A1 | 4/2019 | Zhuang et al. |
| 2021/0042350 A1* | 2/2021 | Zhang ....................... G06T 7/73 |
| 2022/0053195 A1* | 2/2022 | Hurwitz ................ G06F 16/583 |
| 2022/0108427 A1* | 4/2022 | Kim ........................ G06V 10/30 |
| 2022/0269648 A1* | 8/2022 | Kadlabalu .............. G06N 5/025 |

\* cited by examiner

FILTER FOR CAMERA UPLOAD

BACKGROUND

Users take a lot of digital photos, but these photos can quickly exceed an amount of storage available associated with the digital camera (which can be incorporated into a mobile phone). In order to save these photos, users often upload their photos to a content management system. Typically, the user may be provided an option to choose a folder associated with the digital camera that includes the collection of photos, such as the camera roll, from which photos may be selected. The user is then required to select each photo individually, select all photos in the folder, or select a subset of photos, from the collection to upload to the content management system. In some instances, limited automation can be provided to automatically back up all photos in a selected folder.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
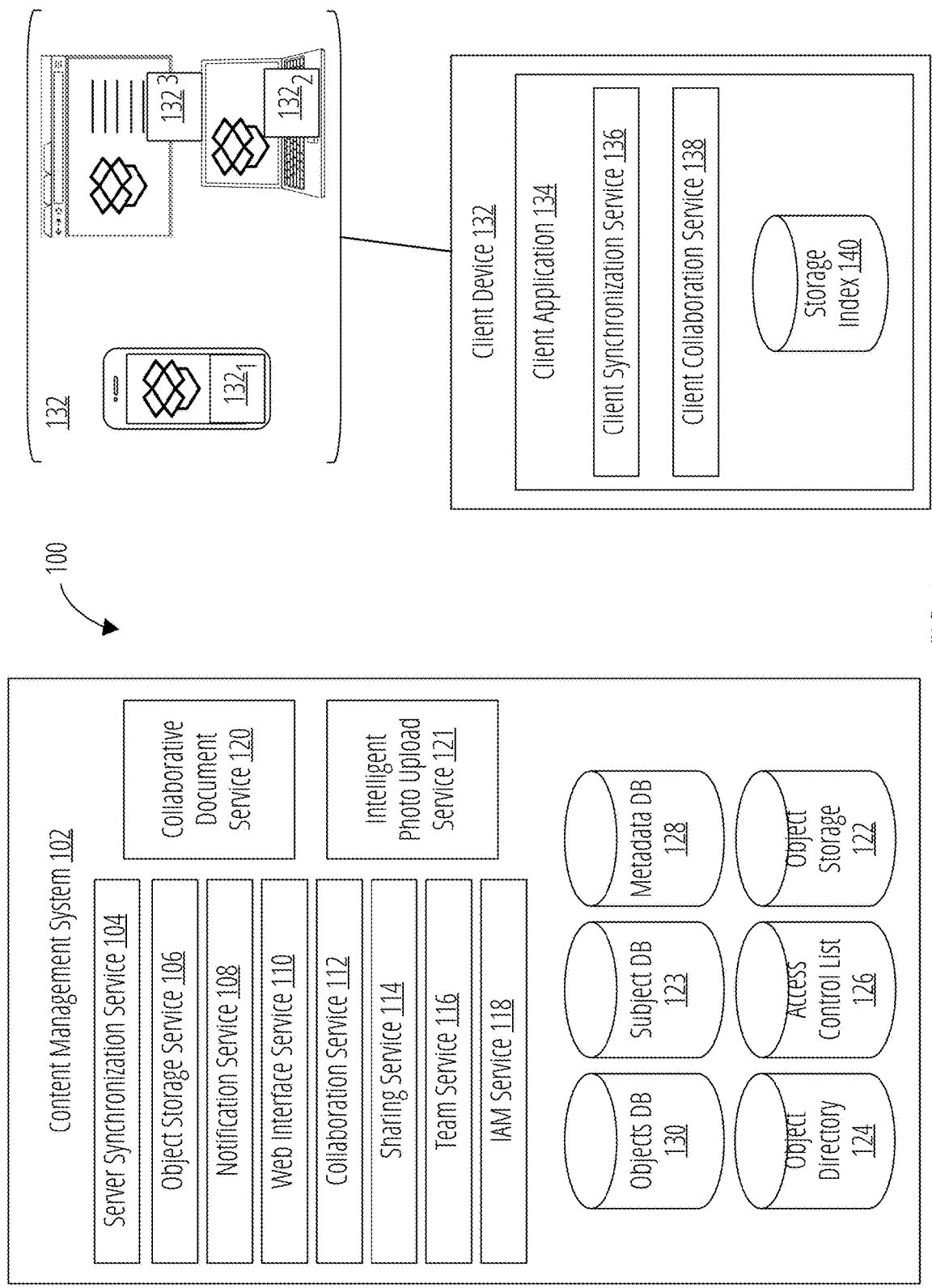
FIG. 1 illustrates an example of a content management system and client devices in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

The present technology addresses the need in the art for greater intelligence in automatic photo upload systems for uploading photos to a content management system. Generally, users may determine from which folder they want to upload from but there is no option to intelligently upload photos with designated attributes, such as photos with only pets, photos with only people with their eyes open, or only photos with text. Existing solutions tend to provide only two options. A user can either allow an automatic photo upload system to upload all photos in folder, or a user can manually select photos to be uploaded to the content management system.

The present technology provides functionality for providing an intelligent photo upload service with an intelligent upload interface that receives a selectable option that corresponds to uploading photos with one or more attributes such that photos that lack the one or more attributes may be excluded from being uploaded. In prior art implementations, users may determine from which album they want to upload from but there is no option to only upload photos with designated attributes. In the present technology, whether a photo has the one or more attributes may be determined using a machine-learning model.

The present technology provides a number of benefits to the user, to the client application, and to the content management system. One such benefit is that users often take many pictures that are not of interest. For example, users' camera rolls are full of photos taken by mistake, or redundant photos taken to ensure capture of a "good photo," or photos that just didn't come out as the user had hoped. The present technology can help users to backup only the photos that the user might consider to be worth keeping without the user having to individually analyze each photo and select it.

Another benefit is that the present technology can also reduce the number of photos that need to be uploaded. Existing automatic photo backup systems generally function to default to uploading all content items in a selected folder, and therefore these systems often upload a lot of extra photos that the user has no interest in saving. This amounts to a lot of wasted data that is transmitted and stored. Accordingly, this amounts to significant wasted bandwidth for the client device and the content management system. The needless upload of these extra photos is also detrimental to the battery life of a client device since Wi-Fi transmissions are a power-intensive service. Of course, the storage of unwanted photos is wasteful at the content management system as well. Thus, the present technology can save bandwidth, battery life, and storage through the intelligent selection of photos to be stored at a content management system.

The intelligent photo upload service of a client application on the client device may use one or more machine-learning models, which may be available from third-party libraries that can be used by a client application on the client device, to determine which photos have the one or more attributes. The photos that have been determined to have the one or more attributes may be uploaded. Once uploaded, in some cases, the one or more attributes may be used to label the respective photos with metadata indicating the presence of the one or more attributes.

At a later time, the user may have additional photos to upload to the content management system. At that time, the intelligent photo upload service can analyze the additional photos to determine which of the additional photos have the one or more attributes. Any photos that were previously analyzed or already uploaded to the content management system can be excluded from this analysis. In some embodiments, the intelligent photo upload service can include a list of photos that have been previously analyzed. In some embodiments, the intelligent photo upload service can use date-based filtering to avoid analyzing photos that were on the client device at the last time the intelligent photo upload service analyzed photos for the selected one or more attributes.

In some embodiments, a user may revise the one or more attributes. For example, the user may select additional attributes of interest or remove attributes of interest as criteria to select a photo to be uploaded to the content management system. In such embodiments, the user may choose to apply the revised attributes to new photos that have not been previously analyzed by the intelligent photo upload service, or the user may choose to reanalyze any photo in the folder on the client device that has not been uploaded to the content management system.

In some embodiments, the present technology can also be used to delete photos on the client device that are not of interest. For example, the user can select an option to utilize the intelligent photo upload service to analyze photos on the client device to identify photos having various attributes as addressed above. The intelligent photo upload service can provide an option to delete all photos that do not contain the attributes. In some embodiments, the automatic deletion of photos can be part of a policy whereby photos are only selected for deletion based on the absence of the attributes, along with other criteria such as the age of the photo or other machine learning models that might be used to predict photos that are likely mistakes or duplicates.

After uploading photos, a content management system may use machine-learning models to analyze them and assign additional labels. For instance, if a user has applied an attribute to upload pictures of people with open eyes, the system may exclude photos where people have closed eyes from being uploaded. However, photos with people with eyes open may also include pets or other objects of interest. In such cases, a new label for pets may not exist on the photo, and the content management system can add a new label to the uploaded photos that include pets.

In some embodiments the disclosed technology is deployed in the context of a content management system having object synchronization capabilities and collaboration features, among others. An example system 100 configuration is shown in FIG. 1, which depicts content management system 102 interacting with client device 132.

Accounts

Content management system 102 can store objects in association with accounts, as well as perform a variety of object management tasks, such as retrieve, modify, browse, and/or share the object(s). Furthermore, content management system 102 can enable an account to access object(s) from multiple client devices.

Content management system 102 supports a plurality of accounts. A subject (user, group, team, company, etc.) can create an account with content management system, and account details can be stored in subject database 123. Subject database 123 can identify a registered subject by a subject ID, and store profile information for registered subjects in association with the subject ID. In some cases, profile information for registered subjects includes a subject name and/or email address. Subject database 123 can include account management information, such as account type (e.g., various tiers of free or paid accounts), storage space allocated, storage space used, client devices 132 having a registered content management client application 134 resident thereon, security settings, personal configuration settings, etc. In some embodiments, some information associated with an account may not be directly stored, and rather this information can be derived. For example, storage space used might be explicitly stored, or it can be calculated when needed.

In some embodiments, subject database 123 need not store complete information associated with an account for a subject. Some portion of information associated with an account for a subject can also be stored in another database of content management system 102 such as metadata database 128, or in a database external to content management system 102.

Subject database 123 can store groups of accounts associated with a subject. Groups can have permissions based on group permissions statements and/or access control lists, and members of the groups can inherit the permissions. For example, a marketing group can have access to one set of objects while an engineering group can have access to another set of objects. An administrator group can modify groups, modify subject accounts, etc. Groups are also subjects identified by subject ID.

In some embodiments, subject database 123 can be broken into a plurality of tables, indexes and other data structures.

Object Storage

A feature of content management system 102 is the storage of objects, which can be stored in object storage 122. An object generally is any entity that can be recorded in a file system. Objects can be any object including digital data such as documents, collaboration objects, text files, audio files, image files, video files, webpages, executable files, binary files, object directories, folders, zip files, playlists, albums, symlinks, cloud docs, mounts, placeholder objects referencing other objects in content management system 102 or in other content management systems, etc.

In some embodiments, objects can be grouped into a collection, which can refer to a folder including a plurality of objects, or a plurality of objects that are related or grouped by a common attribute.

In some embodiments, object storage 122 is combined with other types of storage or databases to handle specific functions. Object storage 122 can store objects, while metadata regarding the objects can be stored in metadata database 128. Likewise, data regarding where an object is stored in object storage 122 can be stored in object directory 124. Additionally, data regarding changes, access, etc. can be stored in objects database 130. Objects database 130 can also include a subject account identifier that identifies the subject IDs that have access to the object.

In some embodiments, objects database 130 can be broken into a plurality of tables, indexes and other data structures.

Each of the various storages/databases such as object storage 122, object directory 124, objects database 130, and metadata database 128 can be comprised of more than one such storage or database and can be distributed over many devices and locations. Other configurations are also possible. For example, data from object storage 122, object directory 124, objects database 130, and/or metadata database 128 may be combined into one or more object storages or databases or further segmented into additional object storages or databases. Thus, content management system 102 may include more or less storages and/or databases than shown in FIG. 1.

In some embodiments, object storage 122 is associated with at least one object storage service 106, which includes software or other processor executable instructions for managing the storage of objects including, but not limited to, receiving objects for storage, preparing objects for storage, selecting a storage location for the object, retrieving objects from storage, etc. In some embodiments, object storage service 106 can divide an object into smaller chunks for storage at object storage 122. The location of each chunk making up an object can be recorded in object directory 124. Object directory 124 can include a content entry for each object stored in object storage 122. The content entry can be associated with an object ID, which uniquely identifies an object.

In some embodiments, each object and each chunk of an object can also be identified from a deterministic hash function. This method of identifying an object and chunks of objects can ensure that object duplicates are recognized as such since the deterministic hash function will output the same hash for every copy of the same object, but will output a different hash for a different object. Using this methodology, object storage service 106 can output a unique hash for each different version of an object.

Object storage service 106 can also designate or record a parent of an object or a content path for an object in objects database 130. The content path can include the name of the object and/or folder hierarchy associated with the object. For example, the content path can include a folder or path of folders in which the object is stored in a local file system on a client device. In some embodiments, object database might only store a direct ancestor or direct child of any object, which allows a full path for an object to be derived, and can be more efficient than storing the whole path for an object.

While objects are stored in object storage 122 in blocks and may not be stored under a tree like directory structure, such directory structure is a comfortable navigation structure for subjects viewing objects. Object storage service 106 can define or record a content path for an object wherein the "root" node of a directory structure can be any directory with specific access privileges assigned to it, as opposed to a directory that inherits access privileges from another directory.

In some embodiments a root directory can be mounted underneath another root directory to give the appearance of a single directory structure. This can occur when an account has access to a plurality of root directories. As addressed above, the directory structure is merely a comfortable navigation structure for subjects viewing objects, but does not correlate to storage locations of objects in object storage 122.

While the directory structure in which an account views objects does not correlate to storage locations of the objects at content management system 102, the directory structure can correlate to storage locations of the objects on client device 132 depending on the file system used by client device 132.

As addressed above, a content entry in object directory 124 can also include the location of each chunk making up an object. More specifically, the content entry can include content pointers that identify the location in object storage 122 of the chunks that make up the object.

Object storage service 106 can decrease the amount of storage space required by identifying duplicate objects or duplicate blocks that make up an object or versions of an object. Instead of storing multiple copies, object storage 122 can store a single copy of the object or block of the object, and object directory 124 can include a pointer or other mechanism to link the duplicates to the single copy.

Object storage service 106 can also store metadata describing objects, object types, folders, file path, and/or the relationship of objects to various accounts, collections, or groups in metadata database 128, in association with the object ID of the object.

Object storage service 106 can also store a log of data regarding changes, access, etc. in objects database 130. Objects database 130 can include the object ID of the object and can optionally include a description of the change or access action along with a time stamp or version number and any other relevant data. Objects database 130 can also include pointers to blocks affected by the change or object access. Object storage service 106 can also provide the ability to undo operations, by using an object version control mechanism that tracks changes to objects, different versions of objects (including diverging version trees), and a change history that can be acquired from objects database 130.

Object Synchronization

Another feature of content management system 102 is synchronization of objects with at least one client device 132. Client devices 132 can take different forms and have different capabilities. For example, client device 132 can be a computing device having a local file system accessible by multiple applications resident thereon. Client device 132 can be a computing device wherein objects are only accessible to a specific application or by permission given by the specific application, and the objects are typically stored either in an application specific space or in the cloud. Client device 132 can be any client device accessing content management system 102 via a web browser and accessing objects via a web interface. While example client device 132 is depicted in form factors such as a laptop, mobile device, or web browser, it should be understood that the descriptions thereof are not limited to devices of these example form factors. For example a mobile device might have a local file system accessible by multiple applications resident thereon, or might access content management system 102 via a web browser. As such, the form factor should not be considered limiting when considering client 134's capabilities. One or more functions described herein with respect to client device 132 may or may not be available on every client device depending on the specific capabilities of the device—the file access model being one such capability.

In many embodiments, client devices 132 are associated with an account of content management system 102, but in some embodiments client devices 132 can access content using shared links and do not require an account.

As noted above, some client devices can access content management system 102 using a web browser. However, client devices can also access content management system 102 using client application 134 stored and running on client device 132. Client application 134 can include a client synchronization service 138.

Client synchronization service 138 can be in communication with server synchronization service 104 to synchronize changes to objects between client device 132 and content management system 102.

Client device 132 can synchronize content with content management system 102 via client synchronization service 138. The synchronization can be platform agnostic. That is, content can be synchronized across multiple client devices of varying types, capabilities, operating systems, etc. Client synchronization service 138 can synchronize any changes (e.g., new, deleted, modified, copied, or moved objects) to objects in a designated location of a file system of client device 132.

Objects can be synchronized from client device 132 to content management system 102, and vice versa. In embodiments wherein synchronization is from client device 132 to content management system 102, a subject can manipulate objects directly from the file system of client device 132, while client synchronization service 138 can monitor directory on client device 132 for changes to files within the monitored folders.

When client synchronization service 138 detects a write, move, copy, or delete of content in a directory that it monitors, client synchronization service 138 can synchronize the changes to content management storage service 106. In some embodiments, client synchronization service 138 can perform some functions of content management storage service 106 including functions addressed above such as dividing the object into blocks, hashing the object to generate a unique identifier, etc. Client synchronization service 138 can index content within client storage index 142 and save the result in client storage index 142. Indexing can include storing paths plus the object identifier, and a unique identifier for each object. In some embodiments, client synchronization service 138 learns the object identifier from server synchronization service 104 and learns the unique client identifier from the operating system of client device 132.

Client synchronization service 138 can use storage index 142 to facilitate the synchronization of at least a portion of the objects within client storage with objects associated with a subject account on content management system 102. For example, client synchronization service 138 can compare storage index 142 with content management system 102 and detect differences between content on client storage and content associated with a subject account on content management system 102. Client synchronization service 138 can then attempt to reconcile differences by uploading, downloading, modifying, and deleting content on client storage as appropriate. Object storage service 106 can store the changed or new block for the object and update objects database 130, metadata database 128, object directory 124, object storage 122, subject database 123, etc. as appropriate.

When synchronizing from content management system 102 to client device 132, data regarding a mount, modification, addition, deletion, move of an object recorded in objects database 130 can trigger a notification to be sent to client device 132 using notification service 108. When client device 132 is informed of the change, client device 132 can make a request for changes listed in objects database 130 since the last synchronization point known to the client device. When client device 132 determines that it is out of synchronization with content management system 102, client synchronization service 138 requests object blocks including the changes and updates its local copy of the changed objects.

In some embodiments, storage index 142 stores tree data structures wherein one tree reflects the latest representation of a directory according to server synchronization service 104, while another tree reflects the latest representation of the directory according to client synchronization service 138. Client synchronization service can work to ensure that the tree structures match by requesting data from server synchronization service 104 or committing changes on client device 132 to content management system 102.

Sometimes client device 132 might not have a network connection available. In this scenario, client synchronization service 138 can monitor the linked collection for object changes and queue those changes for later synchronization to content management system 102 when a network connection is available. Similarly, a subject can manually start, stop, pause, or resume synchronization with content management system 102.

Client synchronization service 138 can synchronize all content associated with a particular subject account on content management system 102. Alternatively, client synchronization service 138 can selectively synchronize some of the objects associated with the particular subject account on content management system 102. Selectively synchronizing only some of the objects can preserve space on client device 132 and save bandwidth.

In some embodiments, client synchronization service 138 selectively stores a portion of the objects associated with the particular subject account and stores placeholder objects in client storage for the remainder portion of the objects. For example, client synchronization service 138 can store a placeholder object that has the same filename, path, extension, metadata, of its respective complete object on content management system 102 but lacking the data of the complete object. The placeholder object can be a few bytes or less in size while the respective complete object might be significantly larger. After client device 132 attempts to access the object, client synchronization service 138 can retrieve the data of the object from content management system 102 and provide the complete object to client device 132. This approach can provide significant space and bandwidth savings while still providing full access to a subject's objects on content management system 102.

While the synchronization embodiments addressed above referred to client device 132 and a server of content management system 102, it should be appreciated by those of ordinary skill in the art that a user account can have any number of client devices 132 all synchronizing objects with content management system 102, such that changes to an object on any one client device 132 can propagate to other client devices 132 through their respective synchronization with content management system 102.

Collaboration Features

Another feature of content management system 102 is to facilitate collaboration between subjects. Collaboration features include object sharing, commenting on objects, co-working on objects in real time, instant messaging, providing presence and "seen" state information regarding objects, etc.

Sharing

Content management system 102 can manage sharing objects via sharing service 114. Sharing an object by providing a link to the object can include making the object accessible from any computing device in network communication with content management system 102. However, in some embodiments a link can be associated with access restrictions enforced by content management system 102 and Identity and Access Management (IAM) service 118. Sharing content can also include linking content using sharing service 114 to share content within content management system 102 with at least one additional subject account (in addition to the original subject account associated with the object) so that each subject account has access to the object. The additional subject account can gain access to the content by accepting the content, which will then be accessible through either web interface service 110 or directly from within the directory structure associated with their account on client device 132. The sharing can be performed in a platform agnostic manner. That is, the content can be shared across multiple client devices 132 of varying type, capabilities, operating systems, etc. The content can also be shared across varying types of subject accounts.

To share an object within content management system 102 sharing service 114 can add associate a subject ID of a team or of one or more subject accounts with a content item in objects database 130 associated with the object, thus granting the added subject account(s) access to the object. Sharing service 114 can also remove subject IDs from being permitted to access a content item in objects database 130 to restrict a subject account's access to the object. Sharing service 114 can record object identifiers, subject identifiers given access to an object, and access levels in objects database 130. For example, in some embodiments, subject identifiers associated with a single content item can specify different permissions for respective subject identifiers with respect to the associated object.

In some embodiments, content management system 102 can include an access control list 126 which includes a description of complete access rights pertaining to a respective object. An access control list for any respective object in content management system can be derived from objects database 130. In some embodiments, it is not desirable to maintain a persistent access control list 126 for a respective object, as an access control list 126 for a respective object can be derived when needed. In some embodiments, objects can inherit access rights from another object such as ancestor objects.

To share objects outside of content management system 102, sharing service 114 can generate a custom network address, such as a uniform resource locator (URL), which allows any web browser to access the object or collection in content management system 102 without any authentication. To accomplish this, sharing service 114 can include content identification data in the generated URL, which can later be used to properly identify and return the requested object. For example, sharing service 114 can include a token identifying an object ID and optionally a subject ID in the generated URL. Upon selection of the URL, the content identification data included in the URL can be transmitted to content management system 102, which can use the received content identification data to identify the appropriate object and return the object.

In addition to generating the URL, sharing service 114 can also be configured to record in objects database 130 that a URL to the object has been created. In some embodiments, an entry into objects database 130 associated with an object can include a URL flag indicating whether a URL to the object has been created. For example, the URL flag can be a Boolean value initially set to 0 or false to indicate that a URL to the object has not been created. Sharing service 114 can change the value of the flag to 1 or true after generating a URL to the object.

In some embodiments, sharing service 114 can associate a set of permissions to a URL for an object. For example, if a subject attempts to access the object via the URL, sharing service 114 can provide a limited set of permissions for the object. Examples of limited permissions include restrictions that the subject cannot download the object, save the object, copy the object, modify the object, etc. In some embodiments, limited permissions include restrictions that only permit an object to be accessed from with a specified domain, i.e., from within a corporate network domain, or by accounts associated with a specified domain, e.g., accounts associated with a company account (e.g., @acme.com).

In some embodiments, sharing service 114 can also be configured to deactivate a generated URL. For example, each entry into objects database 130 can also include a URL active flag indicating whether the content should be returned in response to a request from the generated URL. For example, sharing service 114 can only return an object requested by a generated link if the URL active flag is set to 1 or true. Thus, access to an object for which a URL has been generated can be easily restricted by changing the value of the URL active flag. This allows a subject to restrict access to the shared object without having to move the object or delete the generated URL. Likewise, sharing service 114 can reactivate the URL by again changing the value of the URL active flag to 1 or true. A subject can thus easily restore access to the object without the need to generate a new URL.

In some embodiments, content management system 102 can designate a URL for uploading an object. For example, a first subject with a subject account can request such a URL, provide the URL to a contributing subject and the contributing subject can upload an object to the first subject's subject account using the URL.

Team Service

In some embodiments content management system 102 includes team service 116. Team service 116 can provide functionality for creating and managing defined teams of subject accounts. Teams can be created for a company, with sub-teams (e.g., business units, or project teams, etc.), and subject accounts assigned to teams and sub-teams, or teams can be created for any defined group of subject accounts. Team service 116 can provide a common shared space for the team, private subject account folders, and access limited shared folders. Team service 116 can also provide a management interface for an administrator to manage collections and objects within team and can manage subject accounts that are associated with the team. Teams, sub-teams, subject accounts are all given a subject identifier in subject database 123, and the membership to teams by subject accounts is also recorded in subject database 123.

IAM (Identity and Access Management) Service

In some embodiments, content management system 102 includes IAM service 118. IAM service 118 can authenticate a subject account. For subject accounts with multiple levels of rights (e.g., a subject account with subject rights and administrator rights) IAM service 118 can also facilitate explicit privilege escalation to avoid unintentional actions by administrators.

Object Access

Object storage service 106 can receive a token from client application 134 that follows a request to access an object and can return the capabilities permitted to the subject account.
Presence and Seen State In some embodiments, content management system can provide information about how subjects with which an object is shared are interacting or have interacted with the object. In some embodiments, content management system 102 can report that a subject with which an object is shared is currently viewing the object. For example, client collaboration service 140 can notify notification service 108 when client device 132 is accessing the object. Notifications service 108 can then notify all client devices of other subjects having access to the same object of the presence of the subject of client device 132 with respect to the object.

In some embodiments, content management system 102 can report a history of subject interaction with a shared object. Collaboration service 112 can query data sources such as metadata database 128 and objects database 130 to determine that a subject has saved the object, that a subject has yet to view the object, etc., and disseminate this status information using notification service 108 to other subjects so that they can know who currently is or has viewed or modified the object.

Collaboration service 112 can facilitate comments associated with content, even if an object does not natively support commenting functionality. Such comments can be stored in metadata database 128.

Collaboration service 112 can originate and transmit notifications for subjects. For example, a subject can mention another subject in a comment and collaboration service 112 can send a notification to that subject letting them know that they have been mentioned in the comment. Various other object events can trigger notifications, including deleting an object, sharing an object, etc.

Collaboration service 112 can also provide a messaging platform whereby subjects can send and receive instant messages, voice calls, emails, etc.
Collaboration Objects In some embodiments content management service can also include collaborative document service 120 which can provide an interactive object collaboration platform whereby subjects can simultaneously create collaboration objects, comment in the collaboration objects, and manage tasks within the collaboration objects. Collaboration objects can be files that subjects can create and edit using a collaboration object editor, and can contain collaboration object elements. Collaboration object elements may include a collaboration object identifier, one or more author identifiers, collaboration object text, collaboration object attributes, interaction information, comments, sharing subjects, etc. Collaboration object elements can be stored as database entities, which allows for searching and retrieving the collaboration objects. Multiple subjects may access, view, edit, and collaborate on collaboration objects at the same time or at different times. In some embodiments this can be managed by requiring two subjects access an object through a web interface and there they can work on the same copy of the object at the same time.
Collaboration Companion Interface In some embodiments client collaboration service 140 can provide a native application companion interface for the purpose of displaying information relevant to an object being presented on client device 132. In embodiments wherein an object is accessed by a native application stored and executed on client device 132, where the object is in a designated location of the file system of client device 132 such that the object is managed by client application 134, the native application may not provide any native way to display the above addressed collaboration data. In such embodiments, client collaboration service 140 can detect that a subject has opened an object, and can provide an overlay with additional information for the object, such as collaboration data. For example, the additional information can include comments for the object, status of the object, activity of other subjects previously or currently viewing the object. Such an overlay can warn a subject that changes might be lost because another subject is currently editing the object.

In some embodiments, one or more of the services or storages/databases discussed above can be accessed using public or private application programming interfaces.

Certain software applications can access object storage 122 via an application programming interface (API) on behalf of a subject. For example, a software package such as an application running on client device 132, can programmatically make API calls directly to content management system 102 when a subject provides authentication credentials, to read, write, create, delete, share, or otherwise manipulate content.

A subject can view or manipulate content stored in a subject account via a web interface generated and served by web interface service 110. For example, the subject can navigate in a web browser to a web address provided by content management system 102. Changes or updates to content in the object storage 122 made through the web interface, such as uploading a new version of an object, can be propagated back to other client devices associated with the subject's account. For example, multiple client devices, each with their own client software, can be associated with a single account and objects in the account can be synchronized between each of the multiple client devices.

Client device 132 can connect to content management system 102 on behalf of a subject. A subject can directly interact with client device 132, for example when client device 132 is a desktop or laptop computer, phone, television, internet-of-things device, etc. Alternatively or additionally, client device 132 can act on behalf of the subject without the subject having physical access to client device 132, for example when client device 132 is a server.

Some features of client device 132 are enabled by an application installed on client device 132. In some embodiments, the application can include a content management system specific component. For example, the content management system specific component can be a stand-alone client application 134, one or more application plug-ins, and/or a browser extension. However, the subject can also interact with content management system 102 via a third-party application, such as a web browser, that resides on client device 132 and is configured to communicate with content management system 102. In various implementations, the client application 134 can present a subject interface (UI) for a subject to interact with content management system 102. For example, the subject can interact with the content management system 102 via a file system explorer integrated with the file system or via a webpage displayed using a web browser application.

In some embodiments, client application 134 can be configured to manage and synchronize content for more than one account of content management system 102. In such embodiments client application 134 can remain logged into multiple accounts and provide normal services for the multiple accounts. In some embodiments, each account can appear as folder in a file system, and all objects within that folder can be synchronized with content management system 102. In some embodiments, client application 134 can include a selector to choose one of the multiple accounts to be the primary account or default account.

Intelligent Photo Upload Service

In some embodiments, intelligent photo upload service 121 of content management system 102 can provide an upload service for photos that are determined to have one or more attributes. The attributes may be identified using one or more machine-learning models, which may be available from third-party libraries that can be used by a client application on the client device. The photos that have been determined to have the one or more attributes may be uploaded. Once uploaded, in some cases, the one or more attributes may be used to label the respective photos with metadata indicating the presence of the one or more attributes. In some embodiments, intelligent photo upload service 121 can use date-based filtering to avoid analyzing photos that were on client device 132 at the last time intelligent photo upload service 121 analyzed photos for the selected one or more attributes.

Third Party Services

In some embodiments content management system 102 can include functionality to interface with one or more third party services such as workspace services, email services, task services, etc. In such embodiments, content management system 102 can be provided with login credentials for a subject account at the third-party service to interact with the third-party service to bring functionality or data from those third-party services into various subject interfaces provided by content management system 102.

While content management system 102 is presented with specific components, it should be understood by one skilled in the art, that the architectural configuration of system 100 is simply one possible configuration and that other configurations with more or fewer components are possible. Further, a service can have more or less functionality, even including functionality described as being with another service. Moreover, features described herein with respect to an embodiment can be combined with features described with respect to another embodiment.

While system 100 is presented with specific components, it should be understood by one skilled in the art, that the architectural configuration of system 100 is simply one possible configuration and that other configurations with more or fewer components are possible.

Figure 2:
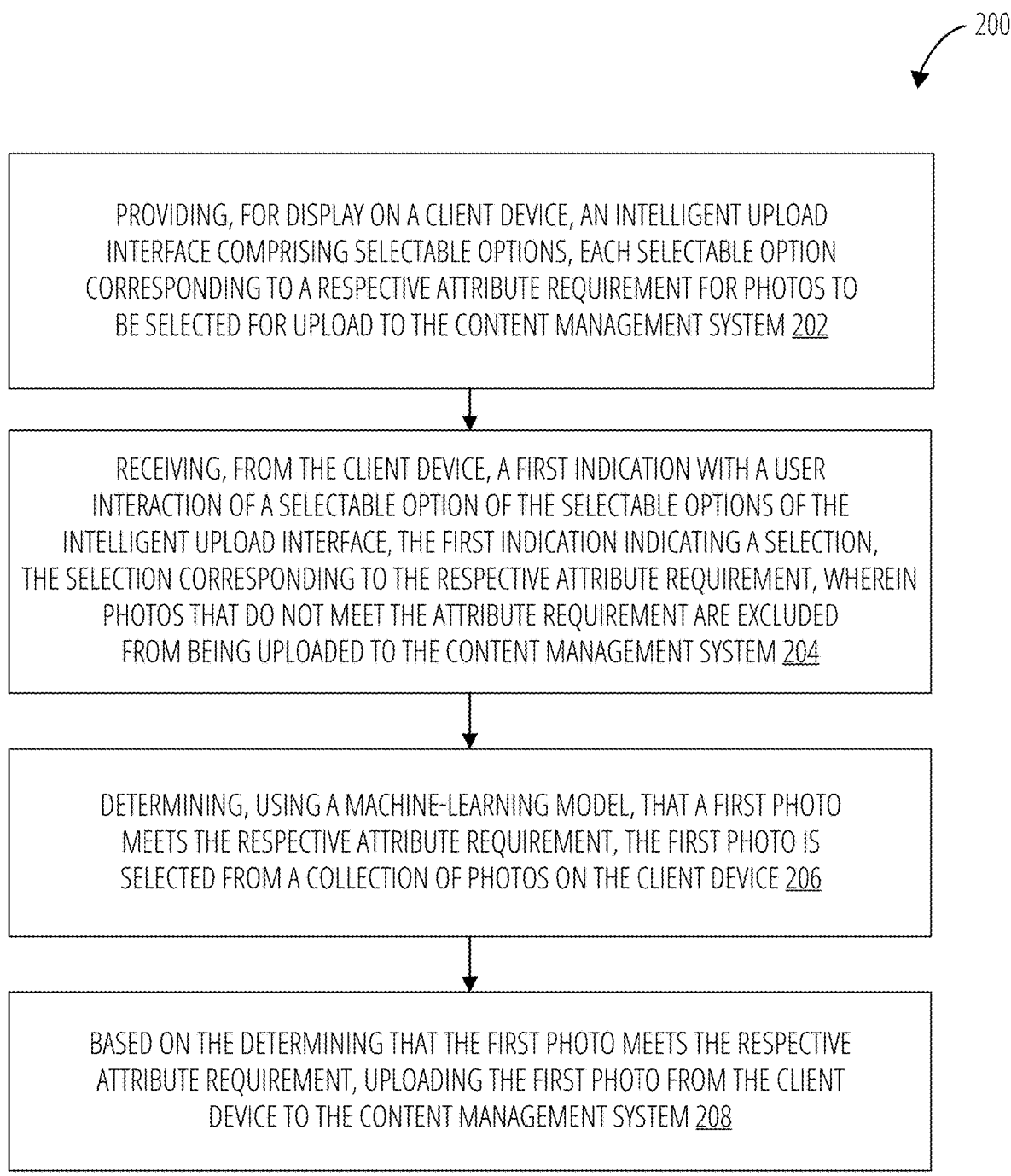
FIG. 2 illustrates a method of automatically selecting a subset of photos to be backed up by a photo upload service provided by a content management system in accordance with some aspects of the present technology.

FIG. 2 illustrates an example method for automatically selecting a subset of photos to be backed up by a photo upload service provided by a content management system, in accordance with some aspects of the present technology. Although example method 200 depicts a particular sequence of operations, the sequence may be altered without departing from the scope of the present disclosure. For example, some of the operations depicted may be performed in parallel or in a different sequence that does not materially affect the function of method. In other examples, different components of an example device or system that implements the method may perform functions at substantially the same time or in a specific sequence.

As addressed above, the present technology provides functionality for providing an intelligent photo upload service with an intelligent upload interface that receives a selectable option that corresponds to uploading photos with one or more attributes such that photos that lack the one or more attributes may be excluded from being uploaded and the photos that include the attributes can be selected for upload to the content management system for storage. For example, the user may wish to upload their latest set of receipts for reimbursement. In such an example, the user might select an attribute to upload only photos that include text, or that are predominantly text. Example method 200 pertains to functionality for providing an intelligent photo upload service with an intelligent upload interface that receives a selectable option that corresponds to uploading photos with one or more attributes.

In block 202, method 200 provides an intelligent upload interface comprising selectable options for display on a client device. Each selectable option may correspond to respective attribute requirements for photos to be selected for upload to the content management system. In some embodiments, client application 134 on client device 132 provides the intelligent upload interface.

In some embodiments, the intelligent upload interface may be provided by intelligent photo upload service 121, which can automatically identify photos on client device 132, or in a directory on client device 132 for automatic upload to content management system 102. In other embodiments, the client application 134 can automatically identify photos on client device 132 or in a directory on client device 132 for automatic upload to content management system 102.

The selectable options may be associated with different attribute requirements such as including or excluding specific people identified using facial recognition, people with their eyes closed, people with their eyes open, people who are not smiling, people who are smiling, pets, text, scenery, etc.

In block 204, method 200 receives a first indication of a user interaction with a selectable option of the selectable options of the intelligent upload interface. The first indication may indicate a selection. For example, the intelligent upload interface on the client device 132 can receive the indication of the selection of the selectable options. The selection may correspond to an attribute requirement. In some cases, photos that do not meet the attribute requirement may be excluded from being uploaded to content management system 102.

In some cases, the excluded photos may still be uploaded if the user chooses. For example, a second indication of a second user interaction may indicate to include a second photo that did not meet the attribute requirement. For example, suppose the attribute requirement was to include only pictures without pets. In that case, the machine-learning model may have accidentally excluded a photo that had a pet in a picture on the wall, but that photo was not intended to be excluded.

Intelligent photo upload service 121 can provide an interface that identifies photos that were selected to be uploaded (or were already uploaded) to content management system 102. The provided interface may include a list of photos that were selected and may provide an option to unselect. In addition, the user can individually select photos that were excluded to be uploaded. This allows the user to correctly select their intended photos.

In an inverse situation, the user may unselect certain photos that the machine-learning model had indicated meet the attribute requirement. If those photos have already been uploaded to content management system 102, intelligent photo upload service 121 can instruct the content management system 102 to delete the photo.

As mentioned above, there may be a number of different selectable options. In some cases, the user may select more than one selectable option. For example, the user may select an option to exclude photos that include pets/animals and an option to exclude photos that include text. In this example, photos with pets/animals or text would be excluded. It may also be possible to group attributes using Boolean "AND" and "NOT" operators as well as the "OR" operator in the example above.

In block 206, method 200 determines that a first photo, in a collection of photos on the client device, includes the attribute. In some cases, client application 134 on client device 132 may use a machine-learning model to determine an existence or nonexistence of the attribute in a photo.

In some embodiments, the machine-learning model may be acquired from a third-party library, including a plurality of object recognition and photo analysis algorithms, and implemented within client application 134 on client device 132. In some examples, the selection of the attribute requirement causes a selection of the machine-learning model that is trained to recognize the features specified by the selected attribute requirement. For example, if the attribute requirement is to exclude people without smiling, a human detection machine-learning model, a face detection machine-learning model, and a smile detection machine-learning model may be separate models or integrated into a single model that are utilized to carry out the task of recognizing the presence or absence of the attribute in the photos that are candidates for upload.

Photo upload tools, such as intelligent photo upload service 121 described herein, are often used repeatedly on the same folder of photos as new photos are continually added. Therefore, it can be useful to log previous upload events to avoid repeating any processing of photos that have already been analyzed. In some instances, this can be performed by only analyzing photos that have been added to the collection since the last upload event. In some instances, this can be performed through a de-duplication mechanism whereby intelligent photo upload service 121 can quickly identify any photos that have been previously analyzed or uploaded to content management system 102. In some instances, photos that have been previously analyzed can receive metadata attributes flagging the photo as having been previously analyzed. More specifically, the metadata attributes may indicate which attributes the respective photos are analyzed for such that the same photos may still be analyzed more than once for different attributes.

Since it is desirable to avoid processing photos that have already been processed, candidate photos for analysis by intelligent photo upload service 121 can be identified from the collection of photos prior to analyzing the photos to determine whether the first photo includes the attribute. The candidate photos may include photos stored on client device 132 after a previous photo upload operation. For example, after the user uploads a batch of photos, the user may take more photos that are saved into their camera roll, the user may have taken screenshots of their client device screen and the screenshots may be saved as photos in a folder on the client device, or the user may have downloaded photos from another source onto the client device. Therefore, photos that have not been processed by intelligent photo upload service 121 are selected as candidates and already analyzed photos can be excluded from a list of candidate photos.

In some cases, prior to uploading, the first photo may be auto-adjusted using an artificial intelligent photo correction algorithm. For example, the first photo may be adjusted for brightness, contrast, etc. In some cases, a machine-learning model may learn from the corrected images either on client device 132 or at content management system 102 with respect to the type of photo correction the user prefers. For example, the user may tend to adjust photos to be dimmer than most users for more ambient lighting. In some cases, the auto-adjustments may first be provided to the user prior to upload. In some cases, a number of options of auto-adjustments may be provided to the user, and a selection of one of the auto-adjustments may be used to train the machine-learning model.

In block 208, method 200 uploads the first photo from client device 132 to content management system 102 based on the determination that the first photo includes or excludes the attribute. In some cases, client application 134 on client device 132 may upload the first photo. In some cases, the first photo may be uploaded with other photos that also include the first attribute.

Just as it is desired to avoid reanalyzing photos that have already been analyzed, it is desired to avoid storing duplicates of the same photo at content management system 102. It can occur that a duplicate of a photo that is already stored at content management system 102 is present in the folder on client device 132. In some instances, the duplicate photo could even have different metadata such that the photo looks new when it is really older (for example, a photo taken on a first device that was emailed to client device 132, can have a last modified file date that is more recent than its creation date. In these cases, before uploading, a hash derived from the first photo may be compared against a list of hashes derived from previously uploaded photos, such that the first photo is uploaded when the hash derived from the first photo is not present in the list of hashes derived from the previously uploaded photos. Such a process prevents duplicates from being uploaded and saves storage space.

In some cases, a third indication of a third user interaction with the selectable options of the intelligent upload interface may be received. The third indication may indicate a change to the attribute requirement for photos to be uploaded to content management system 102 resulting in an updated attribute requirement. For example, the updated attribute requirement may include that uploaded photos do not include photos of pets and the updated attribute requirement may change to require photos with text. In such a case, the user may want photos with text prior to the previous photo upload operation. For example, the previously upload may have been for creating a pet album, whereas a next photo upload operation is to get receipts from the past month for reimbursements.

As such, an exception to the preference to avoid reanalyzing photos that have already been analyzed, as addressed above, is if the photo has not been analyzed for a particular attribute that becomes of interest. When the attribute requirement changes, photos prior to the previous photo upload operation may be analyzed. In some cases, the photos are analyzed using a different machine-learning model configured to determine if the photos meet the updated attribute requirement. In some cases, the different machine-learning model may be a previously used machine-learning model operating under a different mode.

In some cases, the updated attribute requirement may be used to filter the photos on content management system 102. For example, if the updated attribute requirement is a custom attribute requirement that includes more than one requirement, the updated attribute requirement may be selected at content management system 102 as a filter.

In some cases, depending on the attribute requirement, photos may be selectively uploaded to respective folders (e.g., one folder contains photos with people in it, one folder contains photos with text, etc.) Furthermore, in some cases, a deletion of a photo or a set of photos that was previously uploaded may be detected. A machine-learning model may be trained to determine a type or attribute of the deleted photo or set of photos. At a later time, upon upload, one or more photos may be determined to have a matching type or attribute. In some cases, such photos may be recommended as unsuitable for upload. For example, a user may choose to delete a set of photos that are determined to be backlit. In a future upload, photos that are also determined to be backlit may be recommended as unsuitable for upload.

Figure 3:
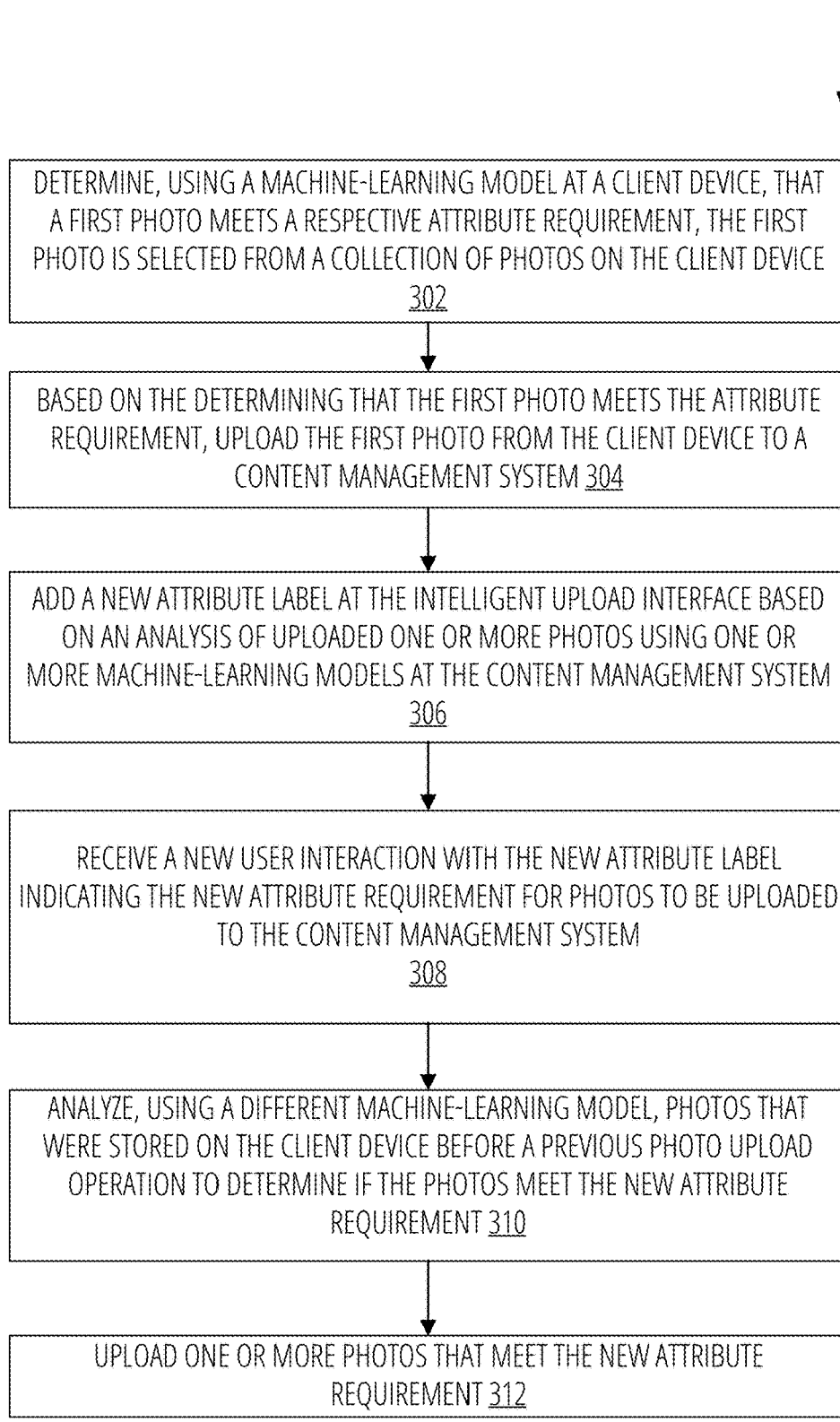
FIG. 3 illustrates an example method for uploading new photos having a new attribute label based on an analysis of uploaded photos using one or more machine-learning models, in accordance with some aspects of the present technology.

FIG. 3 illustrates an example method for uploading new photos having a new attribute label based on an analysis of uploaded photos using one or more machine-learning models, in accordance with some aspects of the present technology. Although example method 300 depicts a particular sequence of operations, the sequence may be altered without departing from the scope of the present disclosure. For example, some of the operations depicted may be performed in parallel or in a different sequence that does not materially affect the function of method 300. In other examples, different components of an example device or system that implements method 300 may perform functions at substantially the same time or in a specific sequence.

In some cases, a new attribute label may be added at the intelligent upload interface based on an analysis of uploaded one or more photos using one or more machine-learning models at content management system 102. Because client device 132 is limited in its capabilities in comparison to content management system 102, it would not be efficient to load machine-learning models on to client device 132 that are not relevant or used by the user. A user may perform searches or filtering on their photos at content management system 102, and it can be determined that the user prefers a type of analysis that is not available on their client device. After learning this preference, content management system 102 could enable additional models on the client device, such as those that match the user's preference for the analysis performed at content management system 102. For example, if at content management system 102, one or more of the machine-learning models indicated that there are photos with plants, such as in FIGS. 6A and 6B, then it would be reasonable to include "plant" as an attribute requirement at client device 132.

According to some examples, similar to as described with respect to block 202 and block 208, method 300 includes determining that a first photo meets an attribute requirement at block 302 and uploading the first photo from the client device to a content management system based on the determining that the first photo meets the attribute requirement at block 304, respectively.

In some cases, after the first photo is uploaded to content management system 102, one or more machine-learning models may analyze the uploaded photo. The one or more machine-learning models can be used to create a new label that can be used to filter photos at content management system 102. For example, within the uploaded photos, there may be a collection of fish. At content management system 102, there may be a new filter label that is provided at a user interface for viewing the uploaded photos.

According to some examples, method 300 includes adding the new attribute label at the intelligent upload interface based on an analysis of uploaded one or more photos using one or more machine-learning models at content management system 102 at block 306. In some cases, client application 134 on client device 132 may add the new attribute label to the intelligent upload interface at the instruction of content management system 102. Following the example above, the "fish" label that was determined to be relevant at the content management system may be added to the intelligent upload interface as an attribute requirement that can be selected to filter photos on the client device to determine which photos should be uploaded.

According to some examples, method 300 includes receiving a new user interaction with the new attribute label indicating the new attribute requirement for photos to be uploaded to content management system 102 at block 308. In some cases, client application 134 on client device 132 may receive the new user interaction to select the new attribute label.

In response to the changed attributed requirement, method 300 may include analyzing, using a same or different machine-learning models, the photos that were stored on client device 132 before a previous photo upload operation to determine if the photos meet the new attribute requirement at block 310. Since these photos were not previously analyzed for the inclusion of the new attribute, even photos that were previously analyzed for other attributes can be analyzed to determine if they should be uploaded.

According to some examples, method 300 includes uploading one or more photos that meet the new attribute requirement at block 312. In some cases, client application 134 on client device 132 may upload the one or more photos. Following the example above, there may be more fish photos on client device 132 that were not uploaded that the user may want to upload.

Figure 4:
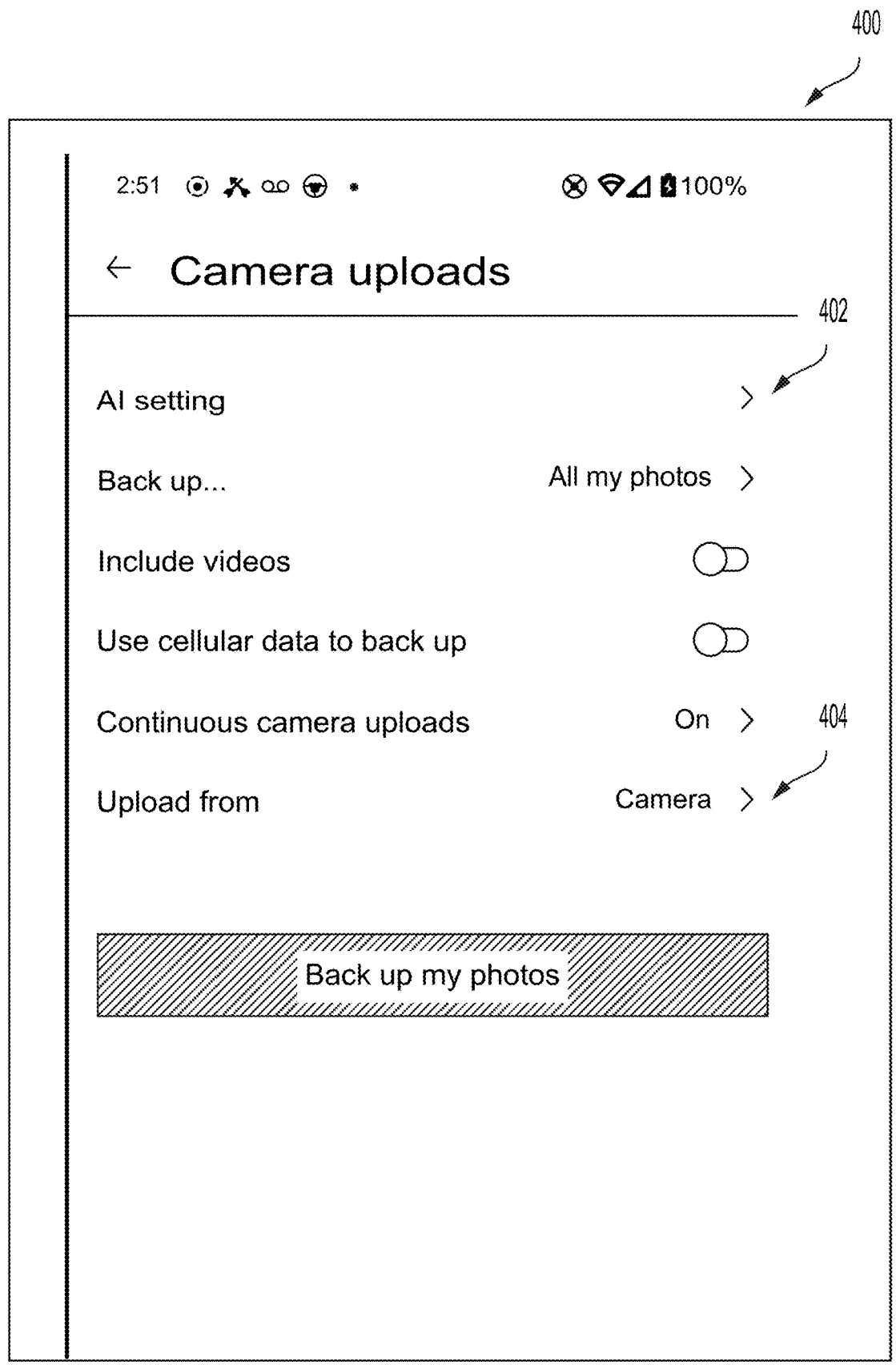
FIG. 4 illustrates an example graphical display showing an intelligent upload interface in accordance with some aspects of the present technology.

FIG. 4 illustrates an example graphical display showing an intelligent upload interface in accordance with some aspects of the present technology. Although graphical user interface 400 illustrates one arrangement of options, other arrangements and other options are contemplated by the present technology. Graphical user interface 400 of FIG. 4 should not be considered limiting of the present technology unless specifically recited in the appended claims.

Graphical user interface 400 displays settings related to uploading photos, including an AI setting 402 for settings related to an intelligent upload interface. The intelligent upload interface may be provided at client device 132 and provide an option to upload certain content item, such as photos or videos. In some cases, the user has the option to choose the folder that they want to upload from, such as using link 404.

Figure 5A:
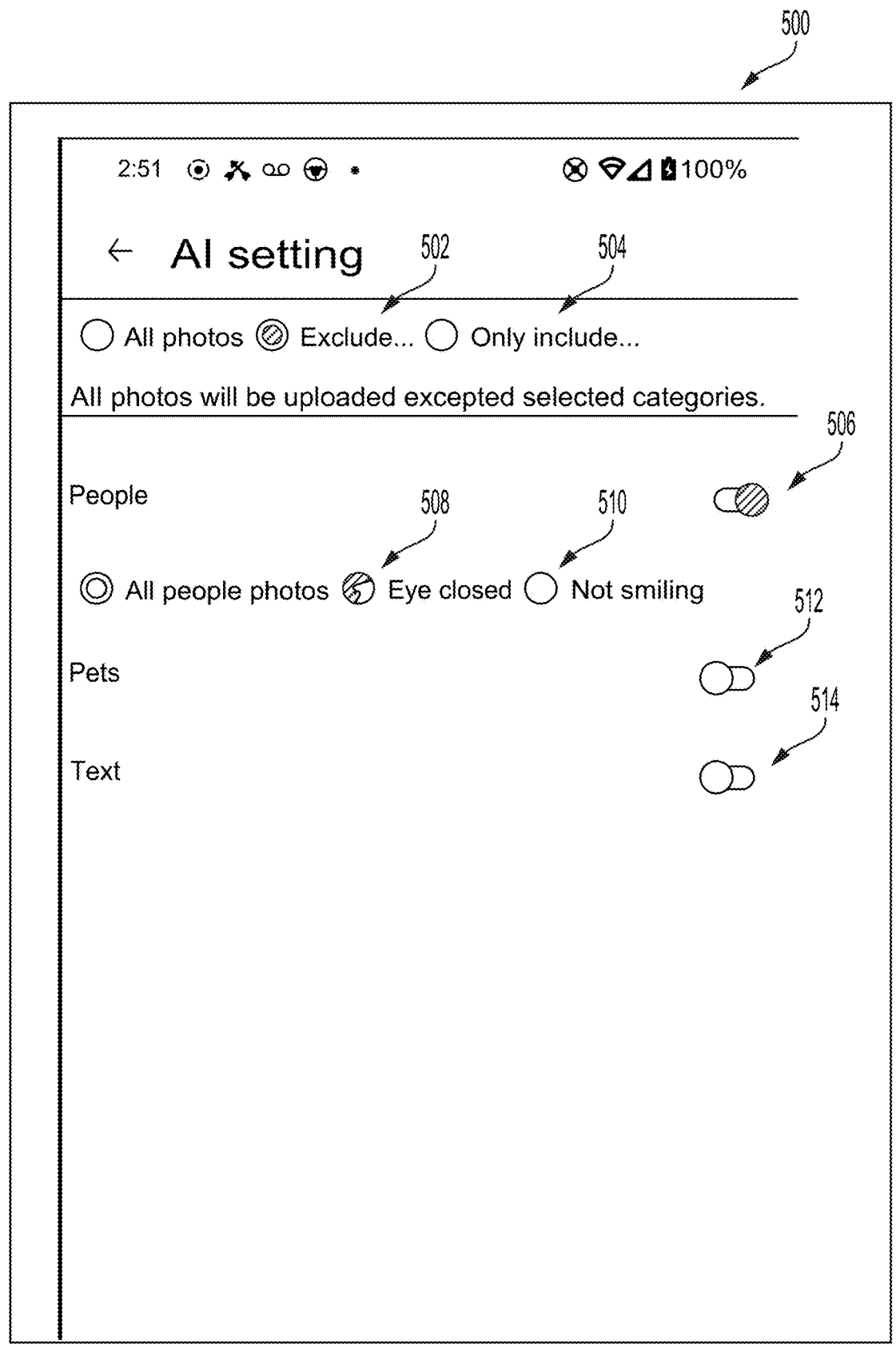
FIG. 5A illustrates an example graphical display showing an intelligent upload interface providing selectable options in accordance with some aspects of the present technology.

FIG. 5A illustrates an example graphical display showing an intelligent upload interface providing selectable options in accordance with some aspects of the present technology. Although graphical user interface 500 illustrates one arrangement of options, other arrangements and other options are contemplated by the present technology. Graphical user interface 500 of FIG. 5A should not be considered limiting of the present technology unless specifically recited in the appended claims.

Graphical user interface 500 showing an intelligent upload interface may include selectable options, which may include an option to exclude certain photos with selected attributes, such as selectable option 502, and/or an option to only select certain photos with selected attributes, such as selectable option 504. For example, the selectable options may be for excluding/only including people, such as selectable option 506, excluding/only including people with their eyes closed, such as selectable option 508, or excluding/only including people that are not smiling, such as selectable option 510. In some cases, the selectable options may further include an option to exclude/only include pets, such as selectable option 512, or an option to exclude/only include text, such as selectable option 514. Alternatively, the selectable options may be photos that only include selectable options, such as only photos with text or only photos with pets. In some examples, a user could create a customized selectable option that is not pre-populated in graphical user interface 500. For example, a user could specify, using inputted text, a particular attribute to exclude or include.

Figure 5B:
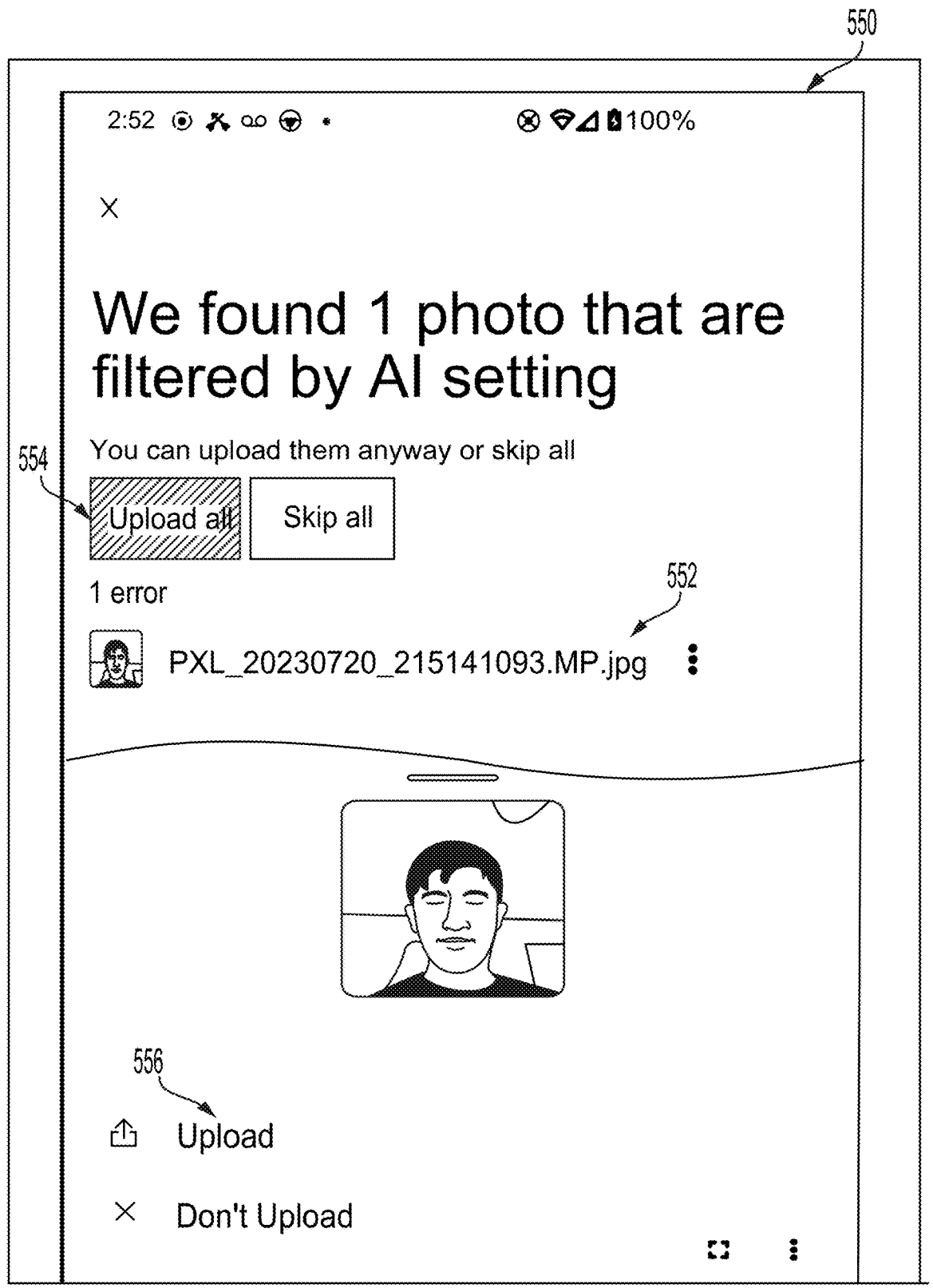
FIG. 5B illustrates an example graphical display showing an intelligent upload interface providing a photo that did not match the attribute requirement in accordance with some aspects of the present technology.

FIG. 5B illustrates an example graphical display showing an intelligent upload interface 550 providing a photo that did not match the attribute requirement in accordance with some aspects of the present technology. Although graphical user interface 550 illustrates one arrangement of options, other arrangements and other options are contemplated by the present technology. Graphical user interface 550 of FIG. 5B should not be considered limiting of the present technology unless specifically recited in the appended claims.

Once photos have been analyzed using the machine-learning model, one or more photos may be excluded from being uploaded. However, graphical user interface 550 showing an intelligent upload interface may provide an option for the user to still include such photos that were determined to be excluded. For example, the machine-learning model may have determined that someone is not smiling for an excluded photo but instead, the user may still find that photo to be acceptable and wants to include it in the upload. One or more excluded photos may be shown in a list, such as list 552, that is provided in the intelligent upload interface. In addition, an option to upload the excluded photos, such as selection option 554 for uploading all the photos in the list or selectable option 556 for uploading a particular photo, may also be provided in the intelligent upload interface.

Figure 6A:
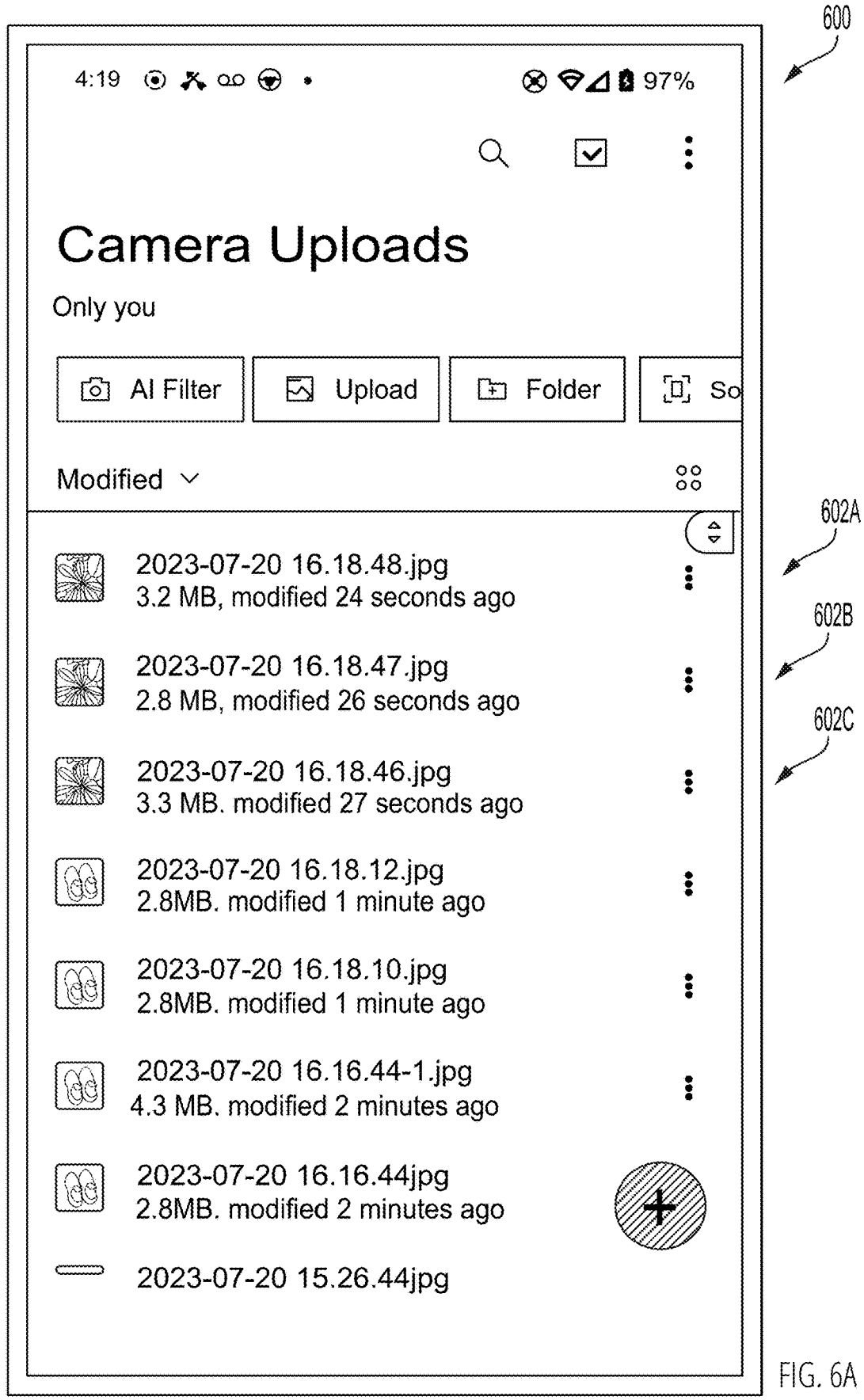
FIG. 6A illustrates an example graphical display showing an intelligent upload interface including a view of uploaded photos on the content management system in accordance with some aspects of the present technology.

FIG. 6A illustrates an example graphical display showing an intelligent upload interface including a view of uploaded photos on the content management system in accordance with some aspects of the present technology. Although graphical user interface 600 illustrates one arrangement of options, other arrangements and other options are contemplated by the present technology. Graphical user interface 600 of FIG. 6A should not be considered limiting of the present technology unless specifically recited in the appended claims.

The uploaded photos on content management system 102 may be visible at the intelligent upload interface. In the graphical user interface 600 of FIG. 6A showing an intelligent upload interface, three recently uploaded photos 602A, 602B, 602C (collectively, 602) were uploaded less than a minute ago and all three photos taken were of the same plant. In some cases, once photos are uploaded, one or more machine-learning models may be used to analyze the uploaded photos to identify an appropriate tag for one or more of the uploaded photos. Different machine-learning models may be used to identify different features, such as objects, people, or scenes, in the photos. For example, the three recently uploaded photos 602 in FIG. 6A all identify a plant and one of the machine-learning models may determine that the label "plant" is associated with the uploaded photos.

Figure 6B:
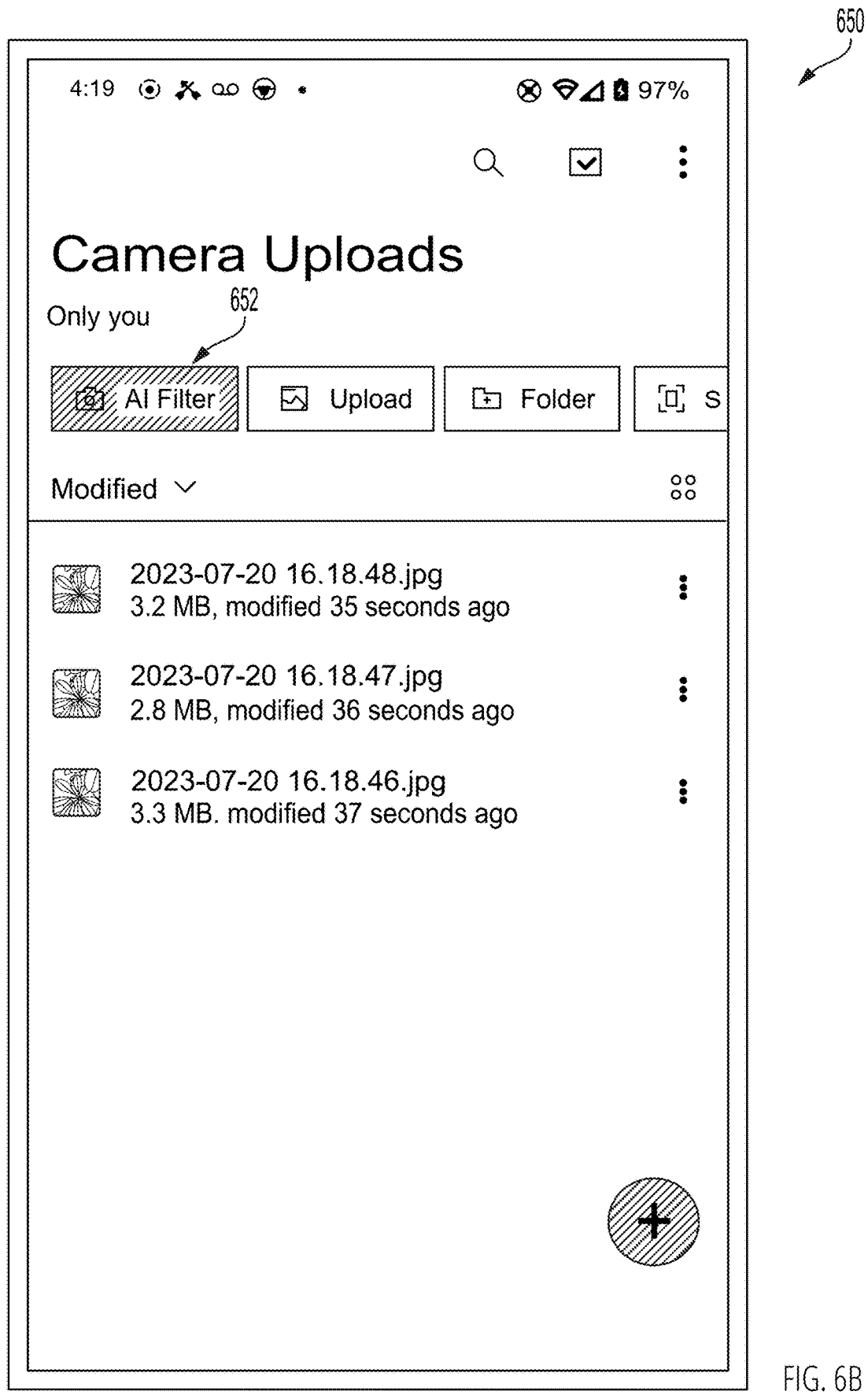
FIG. 6B illustrates an example graphical display showing an intelligent upload interface showing a new attribute requirement generated by the content management system based on the uploaded photos in accordance with some aspects of the present technology.

FIG. 6B illustrates an example graphical display showing an intelligent upload interface 650 showing a filtered view of the uploaded photos based on the new attribute requirement in accordance with some aspects of the present technology. Although graphical user interface 650 illustrates one arrangement of options, other arrangements and other options are contemplated by the present technology. Graphical user interface 650 of FIG. 6B should not be considered limiting of the present technology unless specifically recited in the appended claims.

The "plant" label as mentioned above may further be stored in association with each of the three recently uploaded photos 602, such that photos on content management system 102 may be sorted and filtered to only show certain photos with labels of interest. For example, smart filter 652 may limit to the "plant" label, and as shown in FIG. 6B, only photos with the "plant" label are shown.

Figure 7:
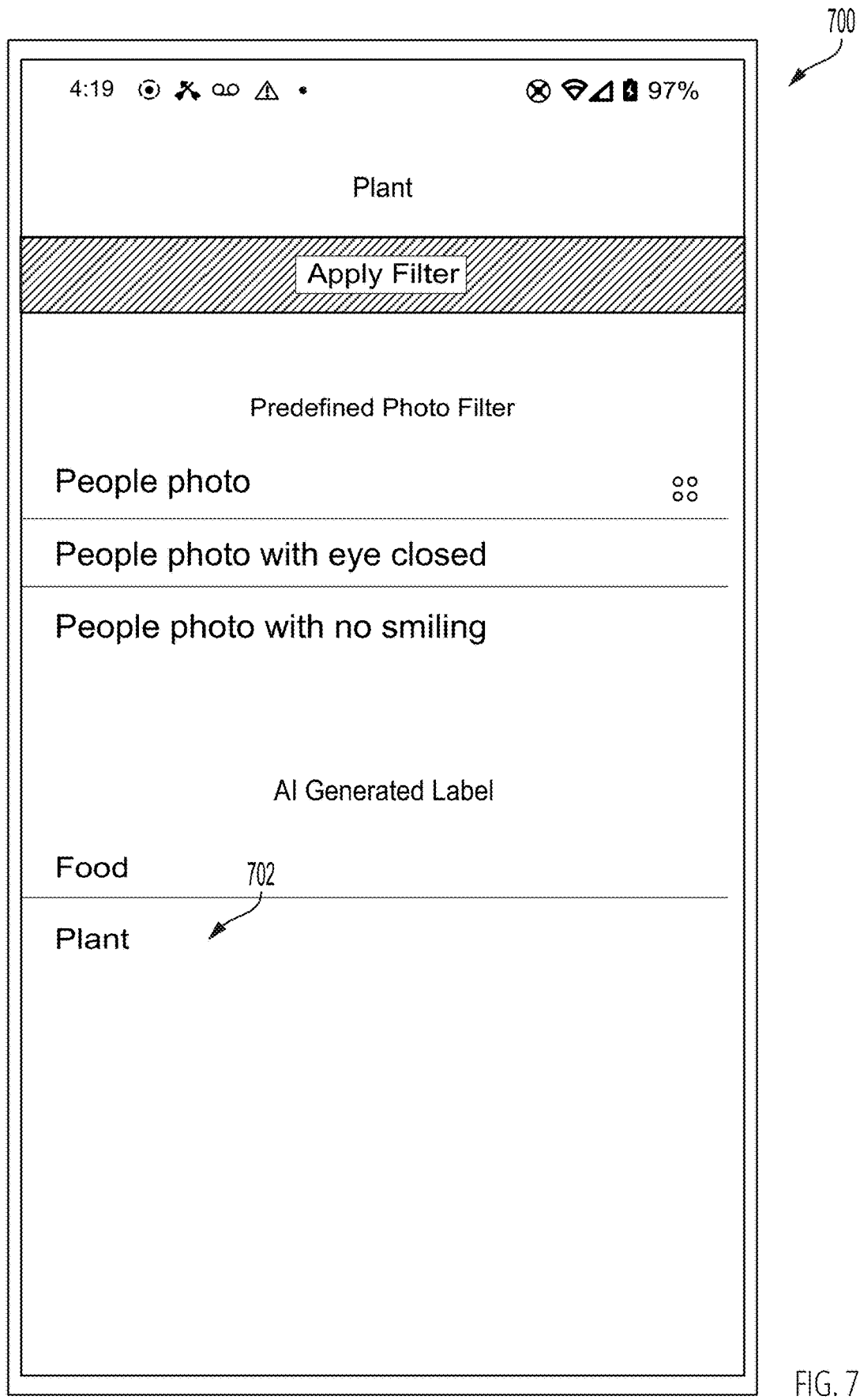
FIG. 7 illustrates an example graphical display showing an intelligent upload interface showing a filtered view of the uploaded photos based on the new attribute requirement in accordance with some aspects of the present technology.

FIG. 7 illustrates an example graphical display showing an intelligent upload interface showing a new attribute requirement generated by the content management system based on the uploaded photos in accordance with some aspects of the present technology. Although graphical user interface 700 illustrates one arrangement of options, other arrangements and other options are contemplated by the present technology. Graphical user interface 700 of FIG. 7 should not be considered limiting of the present technology unless specifically recited in the appended claims.

In some cases, when a new label, such as "plant" label 702 is generated by content management system 102, the new label may be added as a selectable option at the intelligent upload interface at client device 132 as an attribute requirement. As such, an associated machine-learning model that may analyze for the feature associated with the label, such as a plant, may be accessible by client device 132 to make such an analysis if the respective attribute requirement is set. By only including attribute requirements associated with features that have been determined at the content management system to be in one or more uploaded photos, only relevant machine-learning models are provided as an option to run on client device 132.

Figure 8:
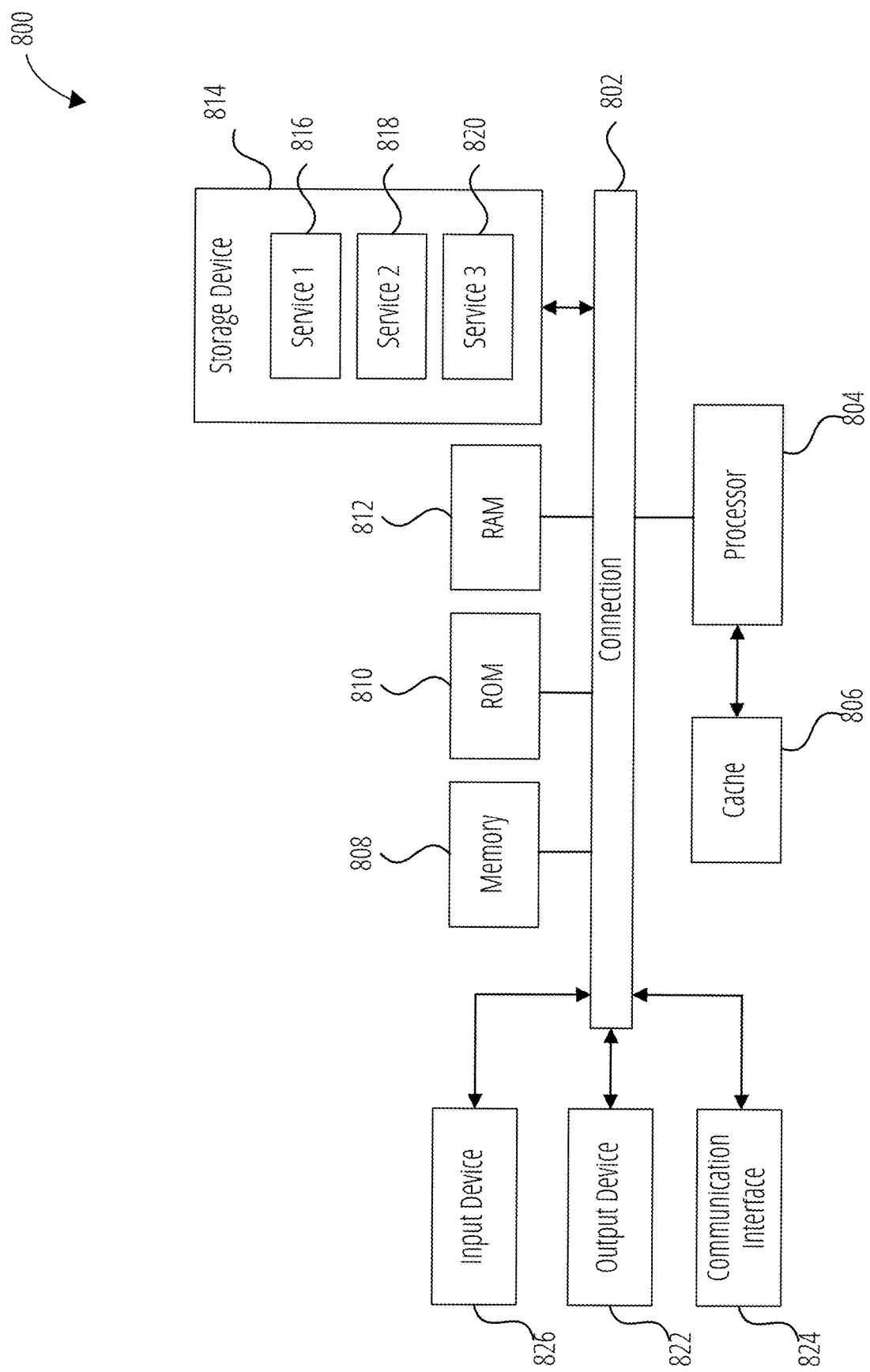
FIG. 8 illustrates a system for carrying out some aspects of the subject matter of the present technology.

FIG. 8 shows an example of computing system 800, which can be for example any computing device making up content management system 102 or client devices 132, or any component thereof in which the components of the system are in communication with each other using connection 802. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 804 and connection 802 that couples various system components including system memory 808, such as read-only memory (ROM) 810 and random-access memory (RAM) 812 to processor 804. Computing system 800 can include a cache of high-speed memory 808 connected directly with, in close proximity to, or integrated as part of processor 804.

Processor 804 can include any general-purpose processor and a hardware service or software service, such as services 806, 818, and 820 stored in storage device 814, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the hardware components, such as processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Figure 9:
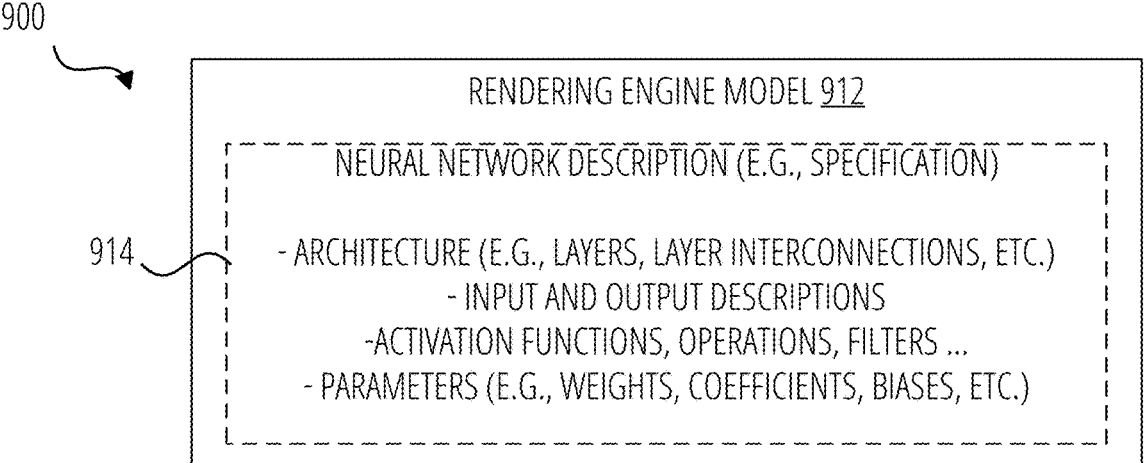
FIG. 9 illustrates an example neural network architecture in accordance with some aspects of the present technology.
Figure 9:
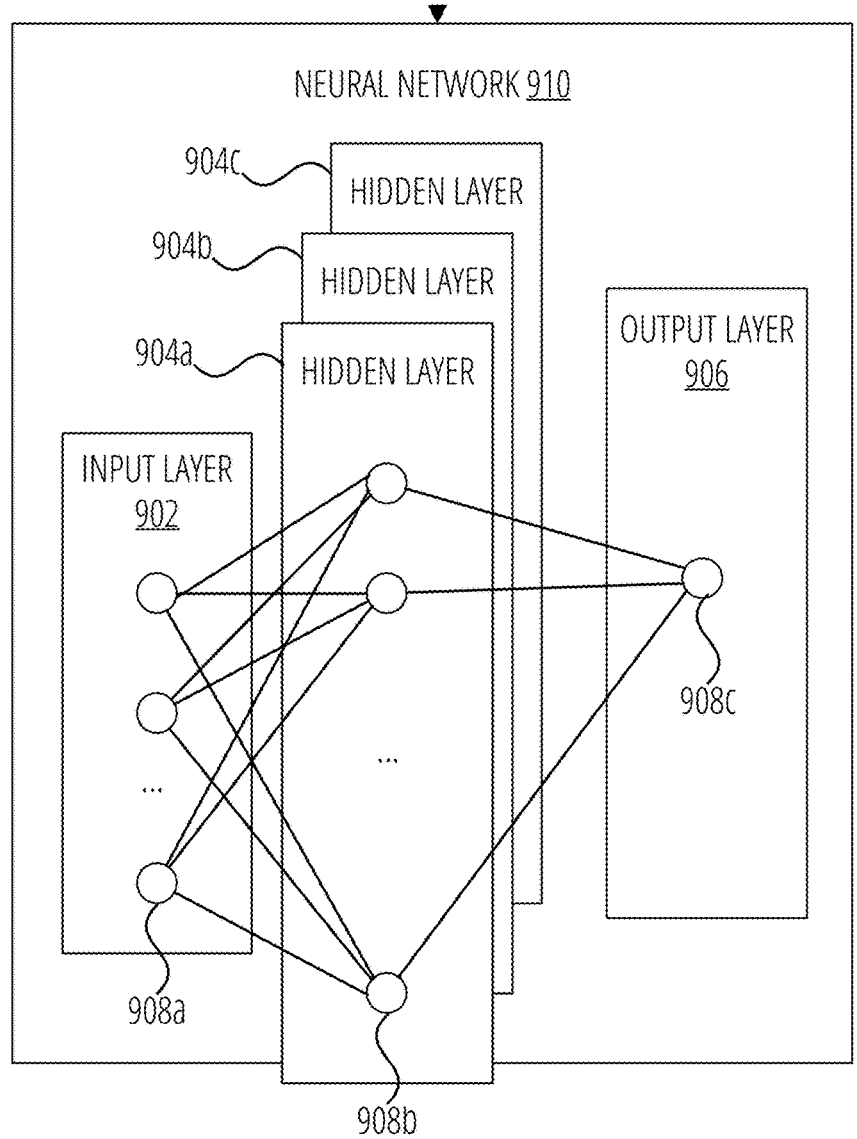

FIG. 9 illustrates an example neural network architecture in accordance with some aspects of the present technology. Architecture 900 includes a neural network 910 defined by an example neural network description 914 in node 908*c* (neural controller). The neural network 910 can represent a neural network implementation of a rendering engine for rendering media data. The neural network description 914 can include a full specification of the neural network 910, including the neural network architecture 900. For example, the neural network description 914 can include a description or specification of the architecture 900 of the neural network 910 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 910 reflects the architecture 900 defined in the input layer 902. In this example, the neural network 910 includes an input layer 902, which includes input data, such as uploaded photos. In one illustrative example, the input layer 902 can include data representing a portion of the input media data such as a patch of data or pixels (e.g., a 728×728 patch of data) in an image corresponding to the input media data (e.g., the uploaded photos).

The neural network 910 includes hidden layers 904*a* through 904N (collectively "904" hereinafter). The hidden layers 904 can include n number of hidden layers, where n is an integer greater than or equal to one. The number of hidden layers can include as many layers as needed for a desired processing outcome and/or rendering intent. The neural network 910 further includes an output layer 906 that provides an output (e.g., rendering output) resulting from the processing performed by the hidden layers 904. In one illustrative example, the output layer 906 can provide generated labels or a probability score indicating whether a feature is in image.

The neural network 910 in this example is a multi-layer neural network of interconnected nodes. Each node can represent a piece of information. Information associated with the nodes is shared among the different layers and each layer retains information as information is processed. In some cases, the neural network 910 can include a feed-forward neural network, in which case there are no feedback connections where outputs of the neural network are fed back into itself. In other cases, the neural network 910 can include a recurrent neural network, which can have loops that allow information to be carried across nodes while reading in input.

Information can be exchanged between nodes through node-to-node interconnections between the various layers. Nodes of the input layer 902 can activate a set of nodes in the first hidden layer 904a. For example, as shown, each of the input nodes of the input layer 902 is connected to each of the nodes of the first hidden layer 904a. The nodes of the hidden layers hidden layer 904a can transform the information of each input node by applying activation functions to the information. The information derived from the transformation can then be passed to and can activate the nodes of the next hidden layer (e.g., 904b), which can perform their own designated functions. Example functions include convolutional, up-sampling, data transformation, pooling, and/or any other suitable functions. The output of the hidden layer (e.g., 904b) can then activate nodes of the next hidden layer (e.g., 804N), and so on. The output of the last hidden layer can activate one or more nodes of the output layer 904a, at which point an output is provided. In some cases, while nodes (e.g., nodes 904a, 904b, 904c) in the neural network 910 are shown as having multiple output lines, a node has a single output and all lines shown as being output from a node represent the same output value.

In some cases, each node or interconnection between nodes can have a weight that is a set of parameters derived from training the neural network 910. For example, an interconnection between nodes can represent a piece of information learned about the interconnected nodes. The interconnection can have a numeric weight that can be tuned (e.g., based on a training dataset), allowing the neural network 910 to be adaptive to inputs and able to learn as more data is processed.

The neural network 910 can be pre-trained to process the features from the data in the input layer 902 using the different hidden layers 904 in order to provide the output through the output layer 906. In an example in which the neural network 910 is used to identify features in an image, the neural network 910 can be trained using training data that includes example images of features such as objects, people, scenery, text, and/or facial features of user and/or labeling and characteristic information (e.g., smiling/not smiling, eyes open/closed, pets, text, etc) of feature(s). For instance, training images can be input into the neural network 910, which can be processed by the neural network 910 to generate outputs which can be used to tune one or more aspects of the neural network 910, such as weights, biases, etc.

In some cases, the neural network 910 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 910, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 910 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 910 can perform a backward pass by determining which inputs (weights) most contributed to the loss of the neural network 910, and can adjust the weights so that the loss decreases and is eventually minimized.

A derivative of the loss with respect to the weights can be computed to determine the weights that contributed most to the loss of the neural network 910. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 910 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 910 can represent any other neural or deep learning network, such as an autoencoder, a deep belief nets (DBNs), a recurrent neural networks (RNNs), etc.

For clarity of explanation, in some instances, the present technology may be presented as including individual functional blocks including functional blocks comprising devices, device components, workflow steps or routines in a method embodied in software, or combinations of hardware and software.

Any of the workflow steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method workflow steps, it is to be understood that the subject matter defined in the appended claims is not necessarily limited to these described features or acts. For example, such functionality can be distributed differently or performed in components other than those identified herein. Rather, the described features and workflow steps are disclosed as examples of components of systems and methods within the scope of the appended claims

What is claimed is:

1. A method of automatically selecting a subset of photos to be backed up by a photo upload service provided by a content management system, the method comprising:
    analyzing one or more content items associated with a user account at the content management system to determine one or more attributes associated with the one or more content items;
    creating, without receiving an indication from the user account, attribute requirement based on each of the one or more attributes, wherein the attribute requirements determine what content items are uploaded to the content management system;
    providing, for display on a client device, an intelligent upload interface comprising selectable options generated by the content management system based on the one or more content items associated with the user account at the content management system, each selectable option corresponding to a respective attribute requirement of the attribute requirements, wherein the respective attribute requirement is for photos to be selected for upload to the content management system;
    receiving, from the client device, a first indication of a user interaction with a selectable option of the selectable options of the intelligent upload interface, the first indication indicating a selection, the selection corresponding to the respective attribute requirement, wherein the photos that do not meet the respective attribute requirement are excluded from being uploaded to the content management system;
    determining, using a machine-learning model, that a first photo meets the respective attribute requirement, the first photo is selected from a collection of photos on the client device; and
    based on the determining that the first photo meets the respective attribute requirement, uploading the first photo from the client device to the content management system.

2. The method of claim 1, wherein the selection corresponding to the respective attribute requirement results in a selection of the machine-learning model that supports analyzing for the respective attribute requirement from a plurality of machine-learning models that are trained to identify the attribute requirements.

3. The method of claim 1, further comprising:
    determining, using the machine-learning model, that a second photo does not meet the respective attribute requirement; and
    receiving a second indication of a second user interaction indicating to include the second photo in the uploading from the client device to the content management system.

4. The method of claim 1, further comprising:
    prior to the uploading the first photo, comparing a hash derived from the first photo against a list of hashes derived from previously uploaded photos, wherein the first photo is uploaded when the hash derived from the first photo is not present in the list of hashes derived from the previously uploaded photos.

5. The method of claim 1, further comprising:
    prior to the uploading the first photo, auto-adjusting the first photo using an artificial intelligent photo correction algorithm.

6. The method of claim 1, further comprising:
    prior to the determining that the first photo meets the respective attribute requirement, identifying candidate photos from the collection of photos on the client device, the candidate photos including photos stored on the client device after a previous photo upload operation, wherein the first photo is one of the candidate photos; and
    evaluating the candidate photos, using the machine-learning model, to determine whether the candidate photos meet the respective attribute requirement.

7. The method of claim 1, further comprising:
    receiving a third indication of a third user interaction with the selectable options of the intelligent upload interface indicating an updated attribute requirement for photos to be uploaded to the content management system;
    analyzing, using a different machine-learning model, photos that were stored on the client device before a previous photo upload operation to determine if the photos meet the updated attribute requirement; and
    uploading one or more photos that meet the updated attribute requirement.

8. The method of claim 1, further comprising:
    adding a new attribute label at the intelligent upload interface based on an analysis of uploaded one or more photos using one or more machine-learning models at the content management system, the new attribute label associated with a new attribute requirement.

9. The method of claim 8, further comprising:
    receiving a fourth indication of a fourth user interaction with the new attribute label indicating the new attribute requirement for the photos to be uploaded to the content management system;

analyzing, using a different machine-learning model, photos that were stored on the client device before a previous photo upload operation to determine if they match the new attribute requirement; and uploading one or more photos that match the new attribute requirement.

10. A system for automatically selecting a subset of photos to be backed up by a photo upload service provided by a content management system, comprising:

storage configured to store instructions; and one or more processors configured to execute the instructions to cause the one or more processors to:

analyze one or more content items associated with a user account at the content management system to determine one or more attributes associated with the one or more content items;

create, without receiving an indication from the user account, attribute requirements based on each of the one or more attributes, wherein the attribute requirements determine what content items are uploaded to the content management system;

provide, for display on a client device, an intelligent upload interface comprising selectable options generated by the content management system based on the one or more content items associated with the user account at the content management system, each selectable option corresponding to a respective attribute requirement of the attribute requirements, wherein the respective attribute requirement is for photos to be selected for upload to the content management system;

receive, from the client device, a first indication of a user interaction with a selectable option of the selectable options of the intelligent upload interface, the first indication indicating a selection, the selection corresponding to the respective attribute requirement, wherein photos that do not meet the respective attribute requirement are excluded from being uploaded to the content management system;

determine, use a machine-learning model, that a first photo meets the respective attribute requirement, the first photo is selected from a collection of photos on the client device; and based on the determining that the first photo meets the respective attribute requirement, upload the first photo from the client device to the content management system.

11. The system of claim 10, wherein the selection corresponding to the respective attribute requirement results in a selection of the machine-learning model that supports analyzing for the respective attribute requirement from a plurality of machine-learning models that are trained to identify the attribute requirements.

12. The system of claim 10, wherein the one or more processors are configured to execute the instructions to cause the one or more processors to:

determine, using the machine-learning model, that a second photo does not meet the respective attribute requirement; and receive a second indication of a second user interaction indicating to include the second photo in the uploading from the client device to the content management system.

13. The system of claim 10, wherein the one or more processors are configured to execute the instructions to cause the one or more processors to:

prior to the uploading the first photo, compare a hash derived from the first photo against a list of hashes derived from previously uploaded photos, wherein the first photo is uploaded when the hash derived from the first photo is not present in the list of hashes derived from the previously uploaded photos.

14. The system of claim 10, wherein the one or more processors are configured to execute the instructions to cause the one or more processors to:

prior to the uploading the first photo, auto-adjust the first photo using an artificial intelligent photo correction algorithm.

15. The system of claim 10, wherein the one or more processors are configured to execute the instructions to cause the one or more processors to:

prior to the determining that the first photo meets the respective attribute requirement, identify candidate photos from the collection of photos on the client device, the candidate photos including photos stored on the client device after a previous photo upload operation, wherein the first photo is one of the candidate photos; and evaluate the candidate photos, using the machine-learning model, to determine whether the candidate photos meet the respective attribute requirement.

16. The system of claim 10, wherein the one or more processors are configured to execute the instructions to cause the one or more processors to:

receive a third indication of a third user interaction with the selectable options of the intelligent upload interface indicating an updated attribute requirement for the photos to be uploaded to the content management system;

analyze, using a different machine-learning model, photos that were stored on the client device before a previous photo upload operation to determine if the photos meet the updated attribute requirement; and upload one or more photos that meet the updated attribute requirement.

17. The system of claim 10, wherein the one or more processors are configured to execute the instructions to cause the one or more processors to:

add a new attribute label at the intelligent upload interface based on an analysis of uploaded one or more photos using one or more machine-learning models at the content management system, the new attribute label associated with a new attribute requirement.

18. The system of claim 17, wherein the one or more processors are configured to execute the instructions to cause the one or more processors to:

receive a fourth indication of a fourth user interaction with the new attribute label indicating the new attribute requirement for the photos to be uploaded to the content management system;

analyze, using a different machine-learning model, photos that were stored on the client device before a previous photo upload operation to determine if they match the new attribute requirement; and upload one or more photos that match the new attribute requirement.

19. A non-transitory computer-readable medium comprising instructions, the instructions, when executed by a computing system, cause the computing system to:

analyze one or more content items associated with a user account at a content management system to determine one or more attributes associated with the one or more content items;

create, without receiving an indication from the user account, attribute requirement based on each of the one or more attributes, wherein the attribute requirements determine what content items are uploaded to the content management system;

provide, for display on a client device, an intelligent upload interface comprising selectable options generated by the content management system based on the one or more content items associated with the user account at the content management system, each selectable option corresponding to a respective attribute requirement of the attribute requirements, wherein the respective attribute requirement is for photos to be selected for upload to the content management system;

receive, from the client device, a first indication of a user interaction with a selectable option of the selectable options of the intelligent upload interface, the first indication indicating a selection, the selection corresponding to the respective attribute requirement, wherein the photos that do not meet the respective attribute requirement are excluded from being uploaded to the content management system;

determine, use a machine-learning model, that a first photo meets the respective attribute requirement, the first photo is selected from a collection of photos on the client device; and based on the determining that the first photo meets the respective attribute requirement, upload the first photo from the client device to the content management system.

20. The non-transitory computer-readable medium of claim 19, the selection corresponding to the respective attribute requirement results in a selection of the machine-learning model that supports analyzing for the respective attribute requirement from a plurality of machine-learning models that are trained to identify the attribute requirements.

* * * * *